US012602996B2

(12) United States Patent
Pullagurla et al.

(10) Patent No.: US 12,602,996 B2
(45) Date of Patent: Apr. 14, 2026

(54) AUTONOMOUS VEHICLE TRAFFIC CONTROL AT HUBS

(71) Applicant: TORC Robotics, Inc., Blacksburg, VA (US)

(72) Inventors: Harish Pullagurla, Blacksburg, VA (US); Omid Karimpour, Blacksburg, VA (US); Himanshu Sardesai, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 283 days.

(21) Appl. No.: 18/448,848

(22) Filed: Aug. 11, 2023

(65) Prior Publication Data

US 2025/0054389 A1 Feb. 13, 2025

(51) Int. Cl.
*G08G 1/0967* (2006.01)
*G08G 1/01* (2006.01)

(52) U.S. Cl.
CPC ..... *G08G 1/096725* (2013.01); *G08G 1/0112* (2013.01); *G08G 1/0133* (2013.01); *G08G 1/0145* (2013.01)

(58) Field of Classification Search
CPC ........... G08G 1/096725; G08G 1/0112; G08G 1/0133; G08G 1/0145
USPC .......................................................... 701/118
See application file for complete search history.

(56) References Cited

U.S. PATENT DOCUMENTS

| | | | | |
|---|---|---|---|---|
| 8,972,080 | B2 * | 3/2015 | Shida | G08G 1/00 701/119 |
| 10,185,327 | B1 * | 1/2019 | Konrardy | G08B 25/00 |
| 11,551,554 | B2 * | 1/2023 | Woodrow | G08G 7/00 |
| 12,198,544 | B2 * | 1/2025 | Nguyen | G08G 1/0116 |
| 2005/0065711 | A1 * | 3/2005 | Dahlgren | G08G 1/096775 701/117 |
| 2014/0309789 | A1 * | 10/2014 | Ricci | G06Q 20/308 700/276 |
| 2017/0262790 | A1 * | 9/2017 | Khasis | G01C 21/3415 |
| 2018/0061231 | A1 * | 3/2018 | Publicover | G08G 1/096775 |
| 2018/0174449 | A1 * | 6/2018 | Nguyen | G08G 1/012 |
| 2019/0066041 | A1 * | 2/2019 | Hance | B65G 1/1373 |
| 2019/0332104 | A1 * | 10/2019 | Woodrow | G08G 5/22 |
| 2020/0150682 | A1 * | 5/2020 | Donnelly | B60R 25/24 |
| 2020/0233415 | A1 * | 7/2020 | Panzica | G01C 21/3461 |
| 2020/0242924 | A1 * | 7/2020 | Publicover | G08G 1/087 |
| 2020/0272145 | A1 * | 8/2020 | Kinoshita | G05D 1/0022 |
| 2020/0349833 | A1 * | 11/2020 | Lerner | G08G 1/0125 |
| 2021/0304595 | A1 * | 9/2021 | Ahire | H04L 9/3247 |
| 2021/0304617 | A1 * | 9/2021 | Ahire | G06V 40/20 |
| 2021/0306823 | A1 * | 9/2021 | Ahire | G06F 16/27 |
| 2022/0092988 | A1 * | 3/2022 | Woodrow | G06Q 10/06312 |

(Continued)

*Primary Examiner* — Luis A Martinez Borrero
(74) *Attorney, Agent, or Firm* — Armstrong Teasdale LLP

(57) ABSTRACT

Systems and methods of automatic correction of map data for autonomous vehicle navigation are disclosed. One or more servers can receive an indication of a traffic condition at an autonomous vehicle hub; upon receiving the indication of the traffic condition at the autonomous vehicle hub, identify an autonomous vehicle traveling a route that includes the autonomous vehicle hub; generate a control command for the autonomous vehicle based on the route and the traffic condition; and transmit the control command to the autonomous vehicle to correct the traffic condition at the autonomous vehicle hub.

20 Claims, 5 Drawing Sheets

(56) References Cited

U.S. PATENT DOCUMENTS

2022/0379917 A1* 12/2022 Henke ............... B60W 60/0027
2025/0196859 A1* 6/2025 Fox-Rabinovitz ........................... B60W 60/00253

* cited by examiner

AUTONOMOUS VEHICLE TRAFFIC CONTROL AT HUBS

TECHNICAL FIELD

The present disclosure relates to autonomous vehicles and, more specifically, to the control of autonomous vehicles to reduce autonomous vehicle traffic at autonomous vehicle hubs.

BACKGROUND

The use of autonomous vehicles has become increasingly prevalent in recent years, offering numerous potential benefits. Autonomous vehicles may travel between predetermined check-in points, or hubs, which may be located at predetermined locations along roadways. Multiple autonomous vehicles may navigate to such hubs along different routes, and traffic jams may result when multiple autonomous vehicles simultaneously arrive at a hub. One challenge of managing autonomous vehicles is a lack of functionality for controlling traffic conditions, because conventional systems cannot detect or address traffic congestion at hubs.

SUMMARY

The systems and methods of the present disclosure attempt to solve the problems set forth above and/or other problems in the art. The scope of the current disclosure, however, is defined by the attached claims, and not by the ability to solve any specific problem.

Disclosed herein are techniques to monitor and detect the traffic conditions at autonomous vehicle hubs and controlling autonomous vehicles to reduce or eliminate the traffic conditions. Hubs may be locations or facilities designed to support and manage autonomous vehicles. These hubs serve as operational centers where autonomous vehicles can be stored, maintained, and dispatched for various purposes, such as transportation services, deliveries, or other autonomous operations. Hubs may be predetermined destinations along routes traveled by autonomous vehicles, ensuring that the autonomous vehicles receive regular support as they navigate on roadways.

Because autonomous vehicle hubs may be destinations or waypoints for autonomous vehicles traveling many different routes, adverse traffic conditions (e.g., traffic jams, traffic congestion on adjacent roadways, etc.) may occur within or around autonomous vehicle hubs. The systems and methods described herein can detect and ameliorate these issues by monitoring the traffic conditions of hubs, identifying vehicles traveling to the hubs, and automatically generating control commands to the identified vehicles to slow, stop, or otherwise prevent the vehicles from arriving at the hub at the same time. These automatic control commands can reduce instances where autonomous vehicle hubs or roads adjacent thereto experience traffic jams or traffic congestion.

One embodiment of the present disclosure is directed to a method. The method includes receiving an indication of a traffic condition at an autonomous vehicle hub; upon receiving the indication of the traffic condition at the autonomous vehicle hub, identifying an autonomous vehicle traveling a route that includes the autonomous vehicle hub; generating a control command for the autonomous vehicle based on the route and the traffic condition; and transmitting the control command to the autonomous vehicle to correct the traffic condition at the autonomous vehicle hub.

The traffic condition may comprise a predetermined number of autonomous vehicles being located at the autonomous vehicle hub. The indication may be received from a second autonomous vehicle at the autonomous vehicle hub. The indication may be received from a computing system of the autonomous vehicle hub. Identifying the autonomous vehicle may comprise accessing mission control data for a plurality of autonomous vehicles.

The control command may comprise a command that causes the autonomous vehicle to slow down. The control command may comprise a command that causes the autonomous vehicle to navigate a predetermined distance from a second vehicle traveling towards the hub. The control command may comprise a command to stop the autonomous vehicle. The method may include receiving a second indication that the traffic condition at the autonomous vehicle hub has been resolved; and generating a second control command for the autonomous vehicle responsive to the second indication. The second control command may comprise a command to resume traveling the route.

Another embodiment of the present disclosure is directed to a system. The system includes one or more processors coupled to non-transitory memory. The system can receive an indication of a traffic condition at an autonomous vehicle hub; upon receiving the indication of the traffic condition at the autonomous vehicle hub, identify an autonomous vehicle traveling a route that includes the autonomous vehicle hub; generate a control command for the autonomous vehicle based on the route and the traffic condition; and transmit the control command to the autonomous vehicle to correct the traffic condition at the autonomous vehicle hub.

The traffic condition may comprise a predetermined number of autonomous vehicles being located at the autonomous vehicle hub. The indication may be received from a second autonomous vehicle at the autonomous vehicle hub. The indication may be received from a computing system of the autonomous vehicle hub. The system may identify the autonomous vehicle by performing operations comprising accessing mission control data for a plurality of autonomous vehicles.

The control command may comprise a command that causes the autonomous vehicle to slow down. The control command may comprise a command that causes the autonomous vehicle to navigate a predetermined distance from a second vehicle traveling towards the hub. The control command may comprise a command to stop the autonomous vehicle. The system may receive a second indication that the traffic condition at the autonomous vehicle hub has been resolved; and generate a second control command for the autonomous vehicle responsive to the second indication. The second control command may comprise a command to resume traveling the route.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
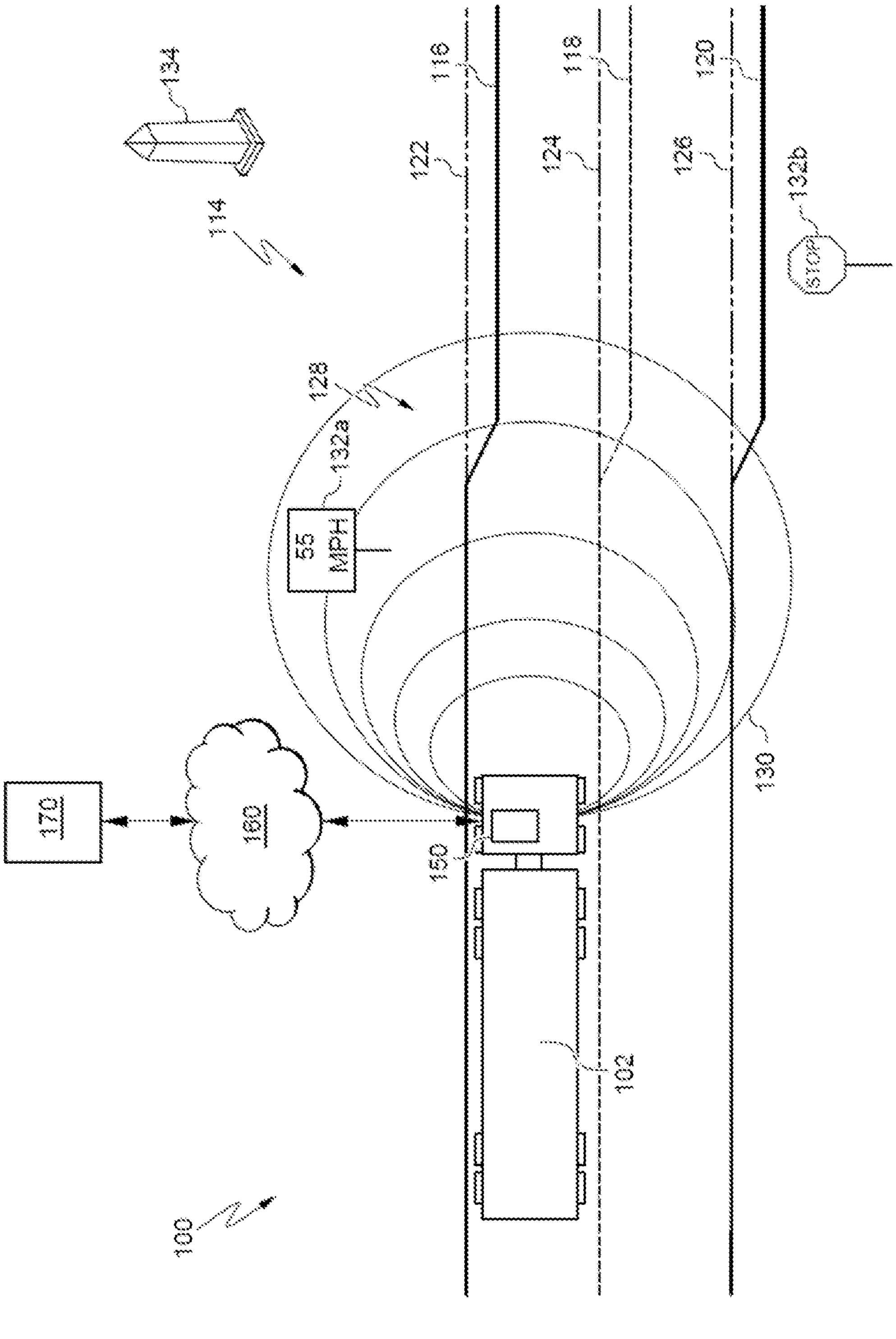
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of the truck 102 may be completely autonomous (fully autonomous), such as self-driving, driverless, or Level 4 autonomy, or semi-autonomous, such as Level 3 autonomy. As used herein, the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around the truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be included as part of a world model, which the truck 102 utilizes to navigate. The world model may include the digital map data (which may be updated and distributed via the various servers described herein) and indications of real-time road features identified using the perception data captured by the sensors of the autonomous vehicle. In some implementations, map data corresponding to the location of the truck 102 may be utilized for navigational purposes. For example, map data corresponding to a predetermined radius around or a predetermined region in front of the truck 102 may be included in the world model used for navigation. As the truck 102 navigates a road, the world model may be updated to replace previous map data with map data that is proximate to the truck 102.

Once the systems on the truck 102 have determined its location with respect to the digital map features (e.g., location on the roadway, upcoming intersections, road signs, etc.), and the map data has been compared to locally identified road features to identify discrepancies, as described herein, and to update the world model, the truck 102 can plan and execute maneuvers and/or routes with respect to the features of the road. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of the truck 102 using the autonomy system 150. The truck 102 is capable of communicatively coupling with a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously. In some implementations, the server 170 may be, or may implement any of the structure or functionality of, the remote server 410*a* described in connection with FIG. 4.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality. Further, the various sensors described in connection with the truck 102 may positioned, mounted, or otherwise configured to capture sensor data from the environment surrounding any type of vehicle.

Figure 2:
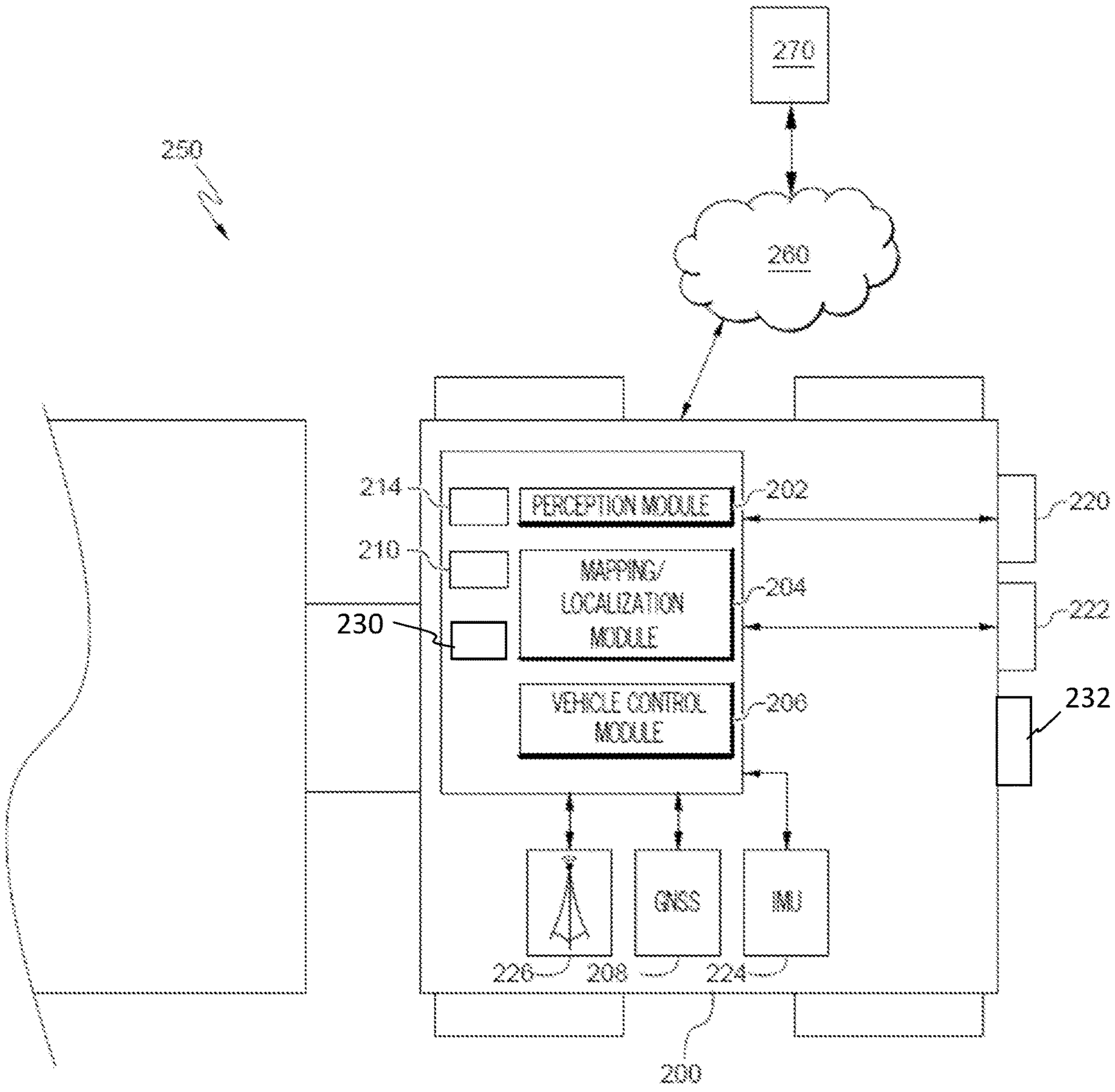
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide variety of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor can process the received reflected data (e.g., raw radar sensor data).

The global navigation satellite system (GNSS) receiver 208 may be positioned on the truck 200 and may be configured to determine a location of the truck 200 via GNSS data, as described herein. The GNSS receiver 208 may be configured to receive one or more signals from a GNSS (e.g., global positioning system (GPS), etc.) to localize the truck 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) 260 via a wired connection, such as, for example, during initial installation, testing, or service of the autonomy system 250 of the truck 200. A wired/wireless connection may be used to download and install lines of code in the form of digital files (e.g., HD digital maps), executable programs (e.g., navigation programs), and other computer-readable code that may be used by the system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck 200. Various other common circuit types may be associated with the autonomy system 250, including signal-conditioning circuitry, communication circuitry, actuation circuitry, and other appropriate circuitry.

Figure 3:
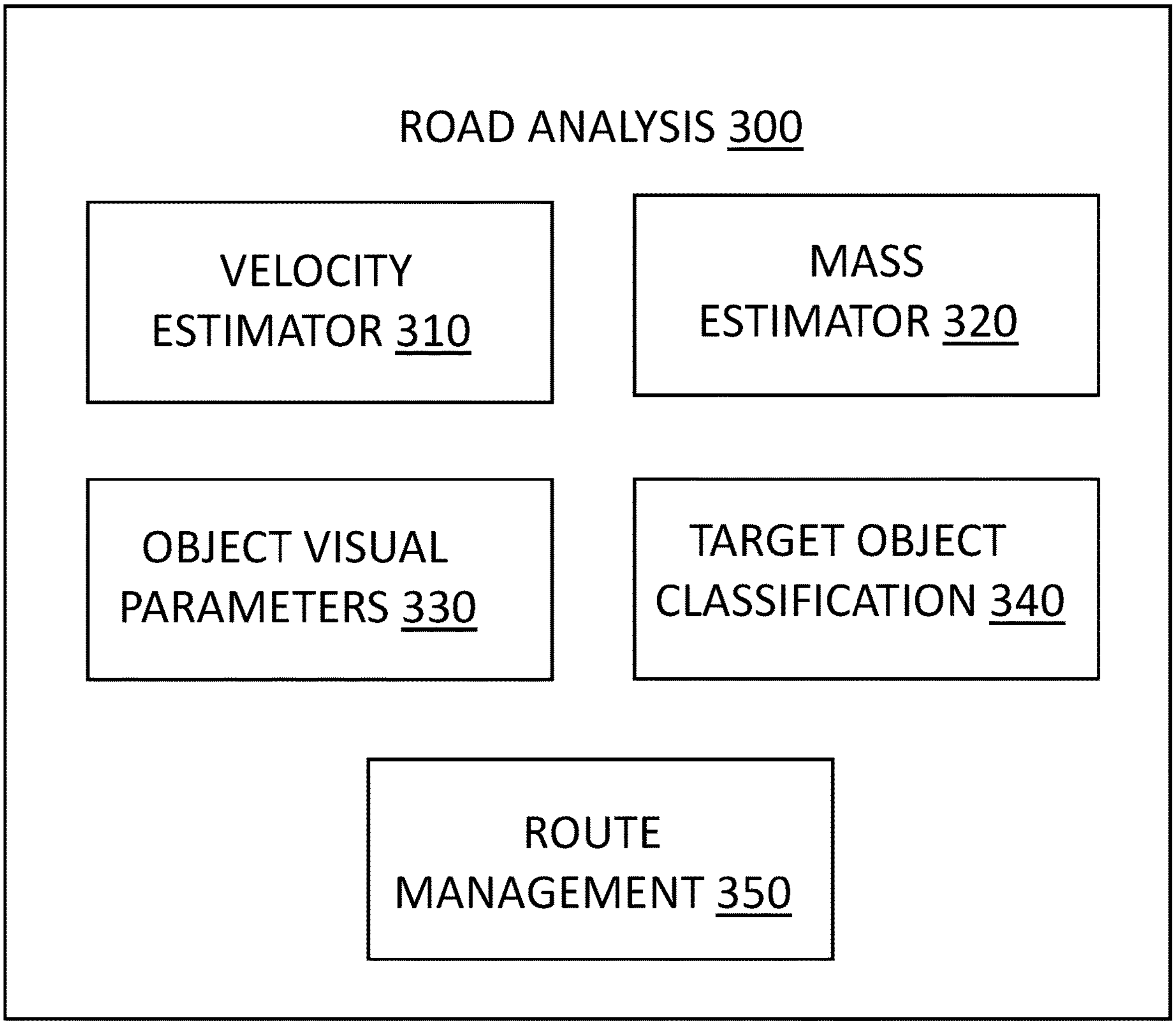
FIG. 3 is a schematic diagram of a road analysis module of the autonomy system of an autonomous vehicle, according to an embodiment.
Figure 4:
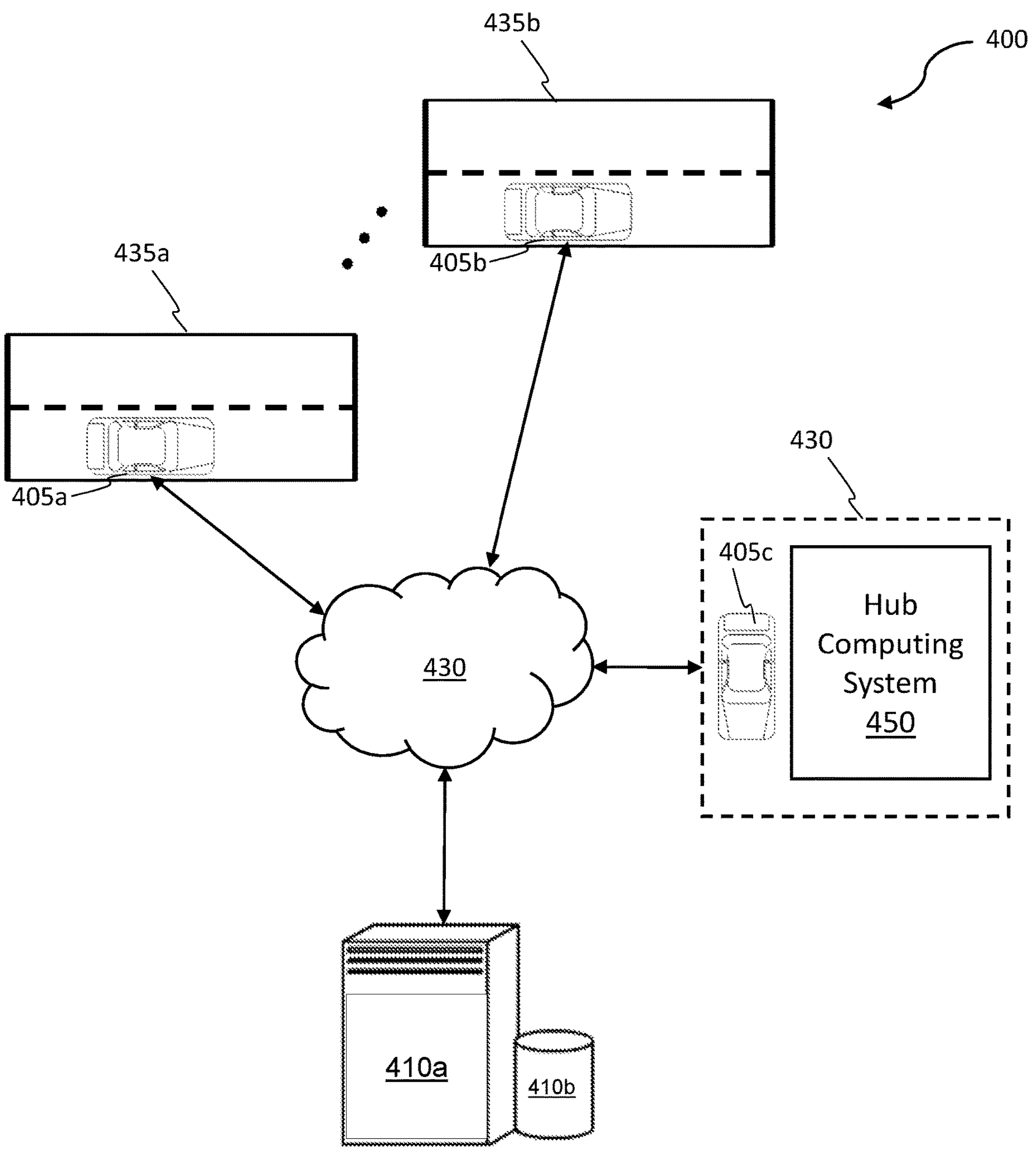
FIG. 4 is a schematic of a system for controlling autonomous vehicles based on traffic conditions detected at autonomous vehicle hubs, according to an embodiment.
Figure 5:
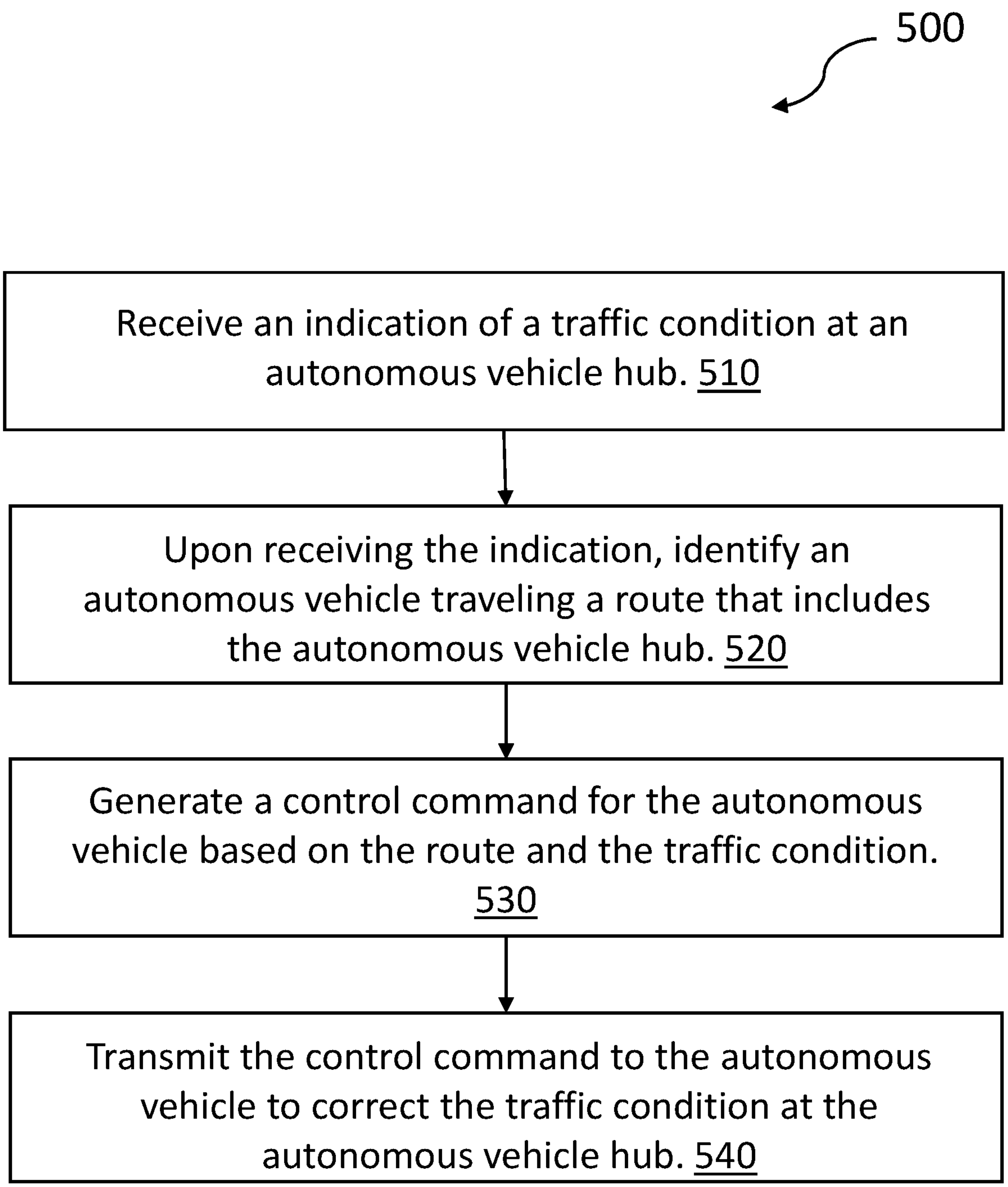
FIG. 5 is a data flow diagram showing processes for controlling autonomous vehicles based on traffic conditions detected at autonomous vehicle hubs, according to an embodiment.

The memory 214 of autonomy system 250 may store data and/or software routines that may assist the autonomy system 250 in performing its functions, such as the functions of the perception module 202, the mapping/localization module 204, the vehicle control module 206, a road analysis module 300 of FIG. 3, the functions of the autonomous vehicle(s) 405*a-c* of FIG. 4, and the method 500 of FIG. 5. The memory 214 may store one or more of any data described herein relating to digital maps, traffic conditions, and perception data or data generated therefrom, including any other vehicles on the roadway proximate to the truck 200 or traffic conditions at one or more autonomous vehicle hubs, which may be generated based on data (e.g., sensor data) captured via various components of the autonomous vehicle (e.g., the perception module 202, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively “perception data”) to sense an environment surrounding the truck and interpret it. To interpret the surrounding environment, the perception module 202 (or “perception engine”) may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) near a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems 222, the camera system 220, and various other externally facing sensors and systems on board the vehicle (e.g., the GNSS receiver 208, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates a presence of the lane lines 116, 118, 120. The perception data may indicate the presence of a line defining a shoulder of the road. Features perceived by the vehicle should track with one or more features stored in a digital map (e.g., in the mapping/localization module 204) of a world model, as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map of the world model and the vehicle will continue to operate in a normal fashion (e.g., driving forward in the left lane of the roadway or per other local road rules). However, in the depicted scenario, the vehicle approaches a new bend 128 in the road that is not stored in locally stored map data because the lane lines 116, 118, 120 have shifted right from their original positions 122, 124, 126.

The system 150 may compare the collected perception data with the stored digital map data to identify errors (e.g., geometric errors or semantic errors) in the stored map data. The example above, in which lanes lines have shifted from an expected geometry to a new geometry, is an example of a geometric error of in the map data. To identify errors in the map data, the system may identify and classify various features detected in the collected perception data from the environment with the features stored in the data of the map data, including digital map data representing features proximate to the truck 102. For example, the detection systems may detect the lane lines 116, 118, 120 and may compare the geometry of detected lane lines with a corresponding expected geometry of lane lines stored in the digital map. Additionally, the detection systems could detect the road signs 132*a*, 132*b* and the landmark 134 to compare such features with corresponding semantic features in the digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the vehicle in its location with respect to the features on a digital map and hence, its actual location. Additionally, and as described in further detail herein, the system 150 may transmit corrections or errors detected from the digital map to one or more servers, which can correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real time image data captured by, for example, the camera system 220 and/or the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. Objects or road features detected via the computer vision function may include, but are not limited to, road signs (e.g., speed limit signs, stop signs, yield signs, informational signs, traffic signals such as traffic lights, signs, or signals that direct traffic such as right turn-only or no-right turn signs, etc.), obstacles, other vehicles, lane lines, lane widths, shoulder locations, shoulder width, or construction-related objects (e.g., cones, signs, construction-related obstacles, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., its motion, size, etc.). The computer vision function may be embodied by a software module that may be communicatively coupled to a repository of images or image data (e.g., visual data and/or point cloud data), and may additionally implement the functionality of the image classification function. Objects detected in the environment surrounding the truck 200 may include other vehicles traveling on the road. Traffic conditions of the road upon which the truck 200 is traveling or adjacent roads can be determined based on an expected speed (e.g., a speed limit within predetermined tolerance range(s), etc.) of other vehicles (and the truck 200) and the current speed of the vehicles on the roadway. If the actual speed of vehicles on the road is less than the expected speed, it may be determined that there is traffic congestion on the roadway.

Mapping/localization module 204 receives perception data that can be compared to one or more digital maps stored in the mapping/localization module 204 to determine where the truck 200 is in the world and/or or where the truck 200 is on the digital map(s) when, for example, generating a world model for the environment surrounding the truck 200. In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204, which may be performed, for example, based on corrections to the world model generated according to the techniques described herein. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation.

The vehicle control module 206 may control the behavior and maneuvers of the truck 200. For example, once the systems on the truck 200 have determined its location with respect to stored map features (e.g., intersections, road signs, lane lines, etc.), the truck 200 may use the vehicle control module 206 and its associated systems to plan and execute maneuvers and/or routes with respect to the features of the environment. The vehicle control module 206 may make decisions about how the truck 200 will move through the environment to reach its goal or destination to complete its mission. The vehicle control module 206 may consume information from the perception module 202 and the maps/localization module 204 to know where it is relative to the surrounding environment and what other traffic actors are doing. Mission control data may include route information, which defines one or more destinations to which the autonomous vehicle is to travel to complete the route. The route may include a path within the map data that indicates which roads the vehicle can utilize to reach the destination(s). Mission control data, including routes, may be received from or queried by one or more servers via the network 260.

The vehicle control module 206 may be communicatively and operatively coupled to a plurality of vehicle operating systems and may execute one or more control signals and/or schemes to control operation of the one or more operating systems. For example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.).

The vehicle control module 206 may be configured to avoid obstacles in the environment surrounding the truck 200 and use one or more system inputs to identify, evaluate, and modify a vehicle trajectory. The vehicle control module 206 is depicted as a single module, but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion. The vehicle control module 206 can control the truck 200 according to a predetermined route, which may be stored as part of a route information in the memory 214 of the system 250. The route information may designate one or more autonomous vehicle hubs, described in further detail in connection with FIG. 4. In some implementations, the vehicle control module 206 may implement control commands received from external sources, such as from one or more external servers. The control commands may be commands that cause the autonomous vehicle to slow down, pull over, navigate behind another, slower vehicle, or deviate from the route by a predetermined distance or amount of time. Such control commands may be implemented to reduce instances of congestion or traffic at autonomous vehicle hubs by modifying the behavior of autonomous vehicles that would otherwise arrive at the autonomous vehicle hubs at the same time.

The system 150, 250 can collect perception data on objects corresponding to the road upon which the truck 200 is traveling, may be traveling in the future (e.g., an intersecting road), or a road or lane adjacent to that in which the truck 200 is traveling. Such objects are sometimes referred to herein as target objects. Collected perception data on target objects and road features may be used to detect the presence of traffic or congestion. By correlating the detected congestion or traffic with the location of the truck 200 (e.g., via global satellite positioning, via route information, etc.) and locally stored map data, the system 150, 250 can determine that certain roads, intersections, or autonomous vehicle hubs proximate to the truck 200 that are experiencing traffic conditions such as congestion (e.g., slowed or stopped traffic), traffic jams, accidents, or construction-related slow-downs, among others. Traffic conditions of the road and/or of any autonomous vehicle hubs proximate to the truck 200 can be transmitted to one or more external servers, which can implement the techniques described herein to generate control commands for nearby autonomous vehicles.

In an embodiment, road analysis module 230 executes one or more artificial intelligence models to predict one or more attributes (e.g., class, speed, etc.) of detected target objects (e.g., other autonomous vehicles, construction-related features such as cones, closed lanes), traffic congestion, or traffic jams. The artificial intelligence model(s) may be configured to ingest data from at least one sensor of the autonomous vehicle and predict the attributes of the object. In an embodiment, the artificial intelligence module is configured to predict a plurality of predetermined attributes of each of one or more target objects relative to the autonomous vehicle. The predetermined attributes may include a velocity of the respective target object relative to the autonomous vehicle and an effective mass attribute of the respective target object.

As used herein, congestion may be a traffic condition of a road or autonomous vehicle hub that occurs as use increases and is characterized by slower speeds, longer trip times, and increased vehicle queues. Traffic congestion may be a recurring phenomenon often linked to peak travel hours or non-recurring phenomenon caused by events such as accidents or roadworks. A traffic jam may be a more severe form of congestion where traffic is brought to a near or complete standstill. Traffic jams occur when traffic comes to a complete halt, often due to an accident, road construction, or other disruptive event on the road or near an autonomous vehicle hub.

In an embodiment, the artificial intelligence model is a predictive machine learning model that may be continuously trained using continuously updated data, such as relative velocity data, mass attribute data, target object classification data, and road feature data. In various embodiments, the artificial intelligence model(s) may be predictive machine-learning models that are trained to determine or otherwise generate predictions relating to road geometry. For example, the artificial intelligence model(s) may be trained to output predictions of lane width, relative lane position within the road, the number of lanes in the road, whether the lanes or road bend and to what degree the lanes or road bend, to predict the presence of intersections in the road, or to predict the characteristics of the shoulder of the road (e.g., presence, width, location, distance from lanes or vehicle, etc.). In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows a road analysis module 300 of system 150, 250. The road condition analysis module 300 includes velocity estimator 310, effective mass estimator 320, object visual parameters component 330, target object classification component 340, and the route management component 350. These components of road analysis module 300 may be either or both software- and hardware-based components.

Velocity estimator 310 may determine the velocity of target objects relative to the ego vehicle. Effective mass estimator 320 may estimate effective masses of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. By comparing the velocity of target objects in the environment to an expected velocity associated with the road (e.g., a speed limit), the road condition analysis module 300 can detect the presence of traffic congestion or a traffic jam proximate to the ego vehicle.

Target object classification component 340 may determine a classification of a target object using information contained within the object visual parameters signal, which may be correlated to various objects and generate an object classification signal. For instance, the target object classification component 340 can determine whether the target object is a plastic traffic cone, an animal, a road sign, or another type of traffic- or road-related feature. Target objects may include moving objects, such as other vehicles, pedestrians, or cyclists in the proximal driving area. Target objects may include fixed objects such as obstacles; infrastructure objects such as rigid poles, guardrails, or other traffic barriers; and parked cars. Fixed objects, also referred to herein as static objects or non-moving objects, can be infrastructure objects as well as temporarily static objects such as parked cars, construction equipment, or temporarily closed lanes. Systems and methods herein may detect the presence and state of traffic congestion on a road or in an autonomous vehicle hub.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals, as well as geometric information relating to the road. The target object classification component 340 can execute artificial intelligence models, for example, which receive sensor data (e.g., perception data as described herein, pre-processed sensor data, etc.) as input and generate corresponding outputs relating to potential traffic conditions indicated in the sensor data.

The sensor data may include, in one example, a speed of the ego vehicle, the expected speed of the roadway upon which the ego vehicle is traveling, and predicted velocity values of other vehicles traveling on the same road as the ego vehicle. In some implementations, only perception data (e.g., one or more images, sequences of images, LiDAR data, radar data, etc.) may be provided as input to the artificial intelligence models. The artificial intelligence models may be trained to output a classification of a traffic condition proximate to the ego vehicle, such as the presence of a traffic jam, traffic congestion, or an absence of traffic.

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., objects or vehicles on the shoulder, on-ramps, or off-ramps, etc.).

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a three-dimensional (3D) model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the components of the ego vehicle. The system 150, 250 may use real-time updates from the vehicle's onboard sensors to continuously update the HD map data as the vehicle moves, as described herein. This enables the vehicle to maintain an up-to-date representation of its surroundings and respond to changing conditions in real-time or near real-time.

The route management component 350 can perform any type of route-related functionality to cause the autonomous vehicle to navigate to one or more destinations. The route management component 350 may store indications of various destinations, which may include vehicle hubs, and may perform preprocessing and route-planning using the locally-stored map data to plan routes for the autonomous vehicle. Route planning may include generating an optimized path from a start position (e.g., a current position of the autonomous vehicle) to one or more destination points (e.g., one or more autonomous vehicle hubs), taking into account factors such as distance, speed limits, traffic conditions, and road type. The route management component 350 may receive requests for route information from one or more servers, and may transmit the route information, including identifications of any autonomous vehicle hubs that are designated as destinations, to the one or more servers.

The route management component 350 may perform localization to determine the location of the autonomous vehicle along the planned route, and can control the movements of the autonomous vehicle to navigate to the one or more destinations of the route. The destinations may be any predetermined locations identified in the locally-stored map data, and may include autonomous vehicle hubs. The route management component 350 can plan and execute maneuvers and/or routes with respect to the features of the environment. The route management component 350 may make decisions about how the autonomous vehicle will move through the environment to get to its goal or destination as it completes its mission. To do so, the route management component 350 may implement any of the functionality of the vehicle control module 206 as described in connection with FIG. 2 to operate various components of the autonomous vehicle to navigate the route.

The route management component 350 may dynamically update the route during navigation, for example, in response to one or more control commands received from one or more servers. The control commands may be commands to slow, stop, or change the route being navigated by the autonomous vehicle. For example, if the control command includes a command to stop, the route management component 350 may suspend navigation of the route, and instead navigate the autonomous vehicle to the nearest shoulder, safe stopping point, or a stopping point designated in the control command, stopping the autonomous vehicle until a command to resume the previous route has been received. In another example, if the control command includes a command to slow down, the route management component 350 may cause the autonomous vehicle to slow by a predetermined amount (e.g., 1 mile-per-hour, 2 miles-per-hour, 5 miles-per-hour) for an amount of time designated in the control command or until a command to resume normal speed has been received.

The control command(s) may include commands to follow another vehicle, for example, to move into a lane with vehicles moving slower than the autonomous vehicle (e.g., the right-most lane of a multi-lane highway, etc.). The control command(s) may include commands that cause the route management component 350 to deviate from or re-calculate the route. For example, the deviation may include an additional, intermediate point via which the route management component 350 can generate a new route. In some implementations, the control command itself may include a replacement route to travel, which can be navigated by the route management component 350 in place of the current route. Further details of control commands are described in connection with FIG. 4.

FIG. 4 illustrates components a system 400 for controlling autonomous vehicles based on traffic conditions detected at autonomous vehicle hubs, according to an embodiment. The system 400 may include autonomous vehicles 405*a-c* (collectively or individually the autonomous vehicle(s) 405) a remote server 410*a*, a system database 410*b*, an autonomous vehicle hub 430, roads 435*a-b* (collectively or individually the road(s) 435), and a hub computing system 450. In some embodiments, the system 400 may include one or more administrative computing devices that may be utilized to communicate with and configure various settings, parameters, or controls of the system 100. Various components depicted in FIG. 4 may be implemented to control autonomous vehicles to reduce instances of traffic congestion or traffic jams at an autonomous vehicle hub 430.

The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums. The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The autonomous vehicles 405 may be similar to and include any of the structure and functionality of the autonomous truck 102 of FIG. 1 or the truck 200 of FIG. 2. The autonomous vehicles 405 may include one or more sensors, communication interfaces or devices, and autonomy systems (e.g., the autonomy system 150 or the autonomy system 250, etc.). The autonomous vehicles 405 may execute various software components, such as the road analysis module 300 of FIG. 3, or any modules, components, or models described in connection with FIGS. 1 and 2. As described herein, the autonomous vehicles 405 may include various sensors, including but not limited to LiDAR sensors, cameras (e.g., red-green-blue (RGB) cameras, infrared cameras, 3D cameras, etc.), and IMUs, among others. The sensors of the autonomous vehicles 405 may be processed using various artificial intelligence model(s) executed by the autonomous vehicles 405 to identify traffic conditions of the roads 435 upon which the autonomous vehicles 405 are traveling or proximate to the autonomous vehicle hub 430. In this example, the autonomous vehicle 405*c* is shown as within or proximate to the autonomous vehicle hub 430, and therefore may detect and transmit indications of traffic conditions of the autonomous vehicle hub to the remote server 410*a*.

As described herein, the autonomous vehicles 405 may utilize the sensor data to detect the presence of traffic conditions (e.g., no traffic, heavy traffic, general traffic congestion, a traffic jam), and transmit the indications of traffic conditions to the remote server 410*a*. In some implementations, an autonomous vehicle 405 may transmit indications of traffic conditions corresponding only to an autonomous vehicle hub 430 (and not general traffic conditions). In one example, the autonomous vehicles 405 may, upon approaching an autonomous vehicle hub 430 (e.g., a predetermined distance from the autonomous vehicle hub 430, a predetermined location along the route, etc.), the autonomous vehicle 405 may detect whether any traffic conditions are present. If traffic conditions such as traffic jams, traffic congestion, roadwork, collisions, or other traffic conditions are detected, the autonomous vehicles 405 can transmit an indication to the remote server 410*a* of the traffic condition. The indication can include an identifier of the autonomous vehicle hub 430 affected by the traffic condition.

In some implementations, the autonomous vehicles 405 may transmit data to the remote server 410*a* in response to one or more requests (e.g., requests for traffic conditions) transmitted from the remote server 410*a*. For example, the remote server 410*a* may monitor the location of autonomous vehicles 405. Upon detecting that an autonomous vehicle 405 is approaching or is within a predetermined distance of an autonomous vehicle hub 430, the remote server 410*a* may transmit a request for traffic data for the road upon which the autonomous vehicle 405 is traveling. In response to the request, the autonomous vehicle 405 can detect and transmit any current traffic conditions that may correspond to the autonomous vehicle hub 430. In some implementations, the autonomous vehicles 405 may detect a change of a traffic condition to an absence of a traffic condition. For example, the autonomous vehicle 405 may detect that a traffic condition has been resolved (e.g., a traffic jam has dispersed). Upon detecting the change, the autonomous vehicle 405 can transmit an indication that the traffic condition has changed (e.g., has been resolved, has reduced in severity, etc.).

The remote server 410*a* can store mission control data for the autonomous vehicles 405 in the system database 410*b*. The mission control data stored in the system database 410*b* may include any type of information related to a mission for each autonomous vehicle 405. For example, the mission control data may include route information (e.g., one or more pre-determined pathways in map data) and indications of autonomous vehicle hub(s) 430 to which an autonomous vehicle 405 will travel. The remote server 410*a* may access the mission control data of one or more autonomous vehicles 405 to identify which autonomous vehicles 405 are to travel to which autonomous vehicle hubs 430. For example, upon identifying that a particular autonomous vehicle hub 430 is congested or expected to be congested, the remote server 410*a* may identify autonomous vehicles 405 currently traveling on the roads 435 towards the autonomous vehicle hub 430, and generate corresponding control actions according to the techniques described herein to reduce traffic congestion at the autonomous vehicle hub 430.

The autonomous vehicle hub 430 can be any location to which autonomous vehicles 405 can travel, and may include roads (e.g., with one or many lanes), intersections, parking spaces, or other road-like features that autonomous vehicles 405 can navigate. The autonomous vehicle hub 430 may be referred to as a depot or base, and can serve as a location for storage, maintenance, and dispatching of autonomous vehicles 405. In one example, the autonomous vehicle hub 430 can be a location to which an autonomous vehicle 405 transports objects (e.g., goods, packages, delivery items, etc.). Any single autonomous vehicle hub 430 may be a destination for any number of autonomous vehicles 405, each of which may be traveling different routes and on different roads 435. In some implementations, an autonomous vehicle hub 430 includes parking and storage space for the autonomous vehicles 405.

The autonomous vehicle hub 430 may include fueling stations, charging stations, maintenance stations, and sensors that monitor the number of autonomous vehicles 405 present, a number of available parking spaces at the autonomous vehicle hub 430, or a number of autonomous vehicles 405 that the autonomous vehicle hub 430 can currently accommodate (e.g., current available capacity). However, because many autonomous vehicles may travel independently using different mission control data and routes, autonomous vehicle hubs 430 may become congested or otherwise experience traffic conditions, as described herein. The remote server 410*a* may perform any of the techniques described herein, including the techniques of the method 500 of FIG. 5, to reduce the traffic conditions experienced at autonomous vehicle hubs 430.

The autonomous vehicle hub 430 can include at least one hub computing system 450, which may be in communication with one or more sensors (e.g., cameras, proximity sensors that detect the presence of autonomous vehicles, etc.) of the autonomous vehicle hub 430. The hub computing system 450 may be any type of computing system, and may include one or more computing devices or servers that can communicate traffic conditions or capacity conditions of the autonomous vehicle hub 430 to the remote server 410*a*. For example, using perception data captured by the sensors of the autonomous vehicle hub 430, the hub computing system 450 can detect (e.g., using various artificial intelligence models described herein) can detect the presence, speed, and attributes of autonomous vehicles 405 approaching or within the autonomous vehicle hub 430.

In some implementations, the hub computing system 450 can collect perception data from roads, parking lots, queuing lanes, or intersections within or proximate to the autonomous vehicle hub 430 to detect the presence of traffic or congestion. To do so, the hub computing system 450 can execute one or more artificial intelligence models, similar to those executed by the system 150, 250 of FIGS. 1 and 2, to predict whether the aforementioned perception data indicates experiencing traffic conditions such as congestion (e.g., slowed traffic, stopped traffic), traffic jams, collisions, or construction-related slow-downs, among others. Traffic conditions of the road and/or of any autonomous vehicle hub 430 can be transmitted by the hub computing system 450 to the remote server 410*a*. The remote server 410*a* can generate control commands for other autonomous vehicles 405 to prevent multiple additional autonomous vehicles 405 from arriving at the congested autonomous vehicle hub 430 and exacerbating the detected traffic conditions.

The hub computing system 450 may continuously monitor the traffic conditions of any roads, intersections, lanes, or other surfaces upon which autonomous vehicles 405 may travel within or proximate to the autonomous vehicle hub 430 to detect adverse traffic conditions. If a traffic condition has been detected, the hub computing system 450 may transmit an indication of the traffic condition (e.g., congestion, traffic jam, collision, etc.) to the remote server 410*a*. If the hub computing system 450 detects that a traffic condition has ceased (e.g., a traffic jam has dispersed and capacity has returned to normal levels), the hub computing system 450 may transmit an indication of that any previously detected traffic conditions at the autonomous vehicle hub 430 have been resolved.

Although only a single autonomous vehicle hub 430 is shown, it should be understood that the remote server 410*a* can communicate with and monitor traffic conditions for any number of autonomous vehicle hubs 430. Further, the two roads 435*a* and 435*b* may be two different roads upon which the respective autonomous vehicles 405*a* and 405*b* are traveling. The roads 435*a* and 435*b* may lead to or connect to roads leading to one or more autonomous vehicle hubs. The roads 435 may include any number of lanes, intersections, traffic lights or signs, a shoulder upon which autonomous vehicles 405 can pull-over, or other traffic-related features. Although the generation of control commands has been described as being performed by the remote server 410*a*, it should be understood that any other computing system described herein, including a respective hub computing system 450 of an autonomous vehicle hub 430, may generate control commands for autonomous vehicles 405.

Although the foregoing has been described with reference to a singular remote sever 410*a*, it should be understood that this is only an example, and that any number of servers, computing devices, or any type of distributed computing environment such as a cloud computing environment, may perform the techniques described herein. Similarly, although the system database 410*b* has been shown and described as a singular element in proximity to the remote server 410*a*, the system database 410*b* may be any type of data storage device, including distributed or cloud-based storage systems, that can store mission control data for one or more autonomous vehicles 405 and traffic condition data for one or more roads 435 or one or more autonomous vehicle hubs 430.

FIG. 5 is a flow diagram of an example method 500 of controlling autonomous vehicles based on traffic conditions detected at autonomous vehicle hubs, according to an embodiment. The steps of the method 500 of FIG. 5 may be executed, for example, by a remote server, including the remote server 410*a*, according to some embodiments. The method 500 shown in FIG. 5 comprises execution steps 510-540. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 500 of FIG. 5 is described as being performed by a remote server (e.g., the remote server 410*a* of FIG. 4) in communication with one or more autonomous vehicles (e.g., the system 150, the system 250, the road analysis module 300, etc.). However, in some embodiments, one or more of the steps may be performed by different processor(s) or any other computing device. For instance, one or more of the steps may be performed by a hub computing system 450, via a cloud-based service (e.g., one or more servers) or another processor in communication with the processor of the autonomous vehicle and/or its autonomy system. Although the steps are shown in FIG. 5 as having a particular order, it is intended that the steps may be performed in any order. It is also intended that some of these steps may be optional.

At step 510 of the method 500, the remote server (e.g., the remote server 410*a*) can receive an indication of an adverse traffic condition at an autonomous vehicle hub (e.g., an autonomous vehicle hub 430). The indication may identify the autonomous vehicle hub to which the traffic condition corresponds. The traffic condition may be the presence of a traffic jam, traffic congestion, or a condition that is likely to lead to a traffic jam and/or congestion, such as road work, closed lanes, accidents, collisions, or changes to road conditions (e.g., changes in weather that worsen driving conditions, such as heavy rain, snow, sleet, ice, etc.). In some implementations, the traffic condition may relate to a road proximate to, or leading towards, the autonomous vehicle hub. For example, the indication may identify that the traffic condition relates to a road that an autonomous vehicle would need to travel in order to arrive at the autonomous vehicle hub.

The indication may be received from an autonomous vehicle located at or proximate to the autonomous vehicle hub (e.g., parked in a parking space, within a queueing lane or road of the autonomous vehicle hub, traveling on a road that leads to the autonomous vehicle hub, etc.). As described herein, autonomous vehicles in communication with the remote server may detect traffic conditions as they navigate their assigned or determined routes (e.g., to carry out a mission). In some implementations, upon detecting any traffic condition on the road, the autonomous vehicle may detect and transmit indications of traffic conditions to the remote. The remote server or the autonomous vehicle may correlate the location of the traffic condition with any nearby autonomous vehicle hubs (e.g., using stored map data) to determine whether the detected traffic condition would affect the autonomous vehicle hub (e.g., result in traffic jams, congestion, etc.).

In some implementations, the autonomous vehicle may transmit the indication of the traffic condition only upon detecting the traffic condition within or proximate to (e.g., within a predetermined distance, etc.) of an autonomous vehicle hub to which it is traveling. The indication received by the remote server may include an identifier of the autonomous vehicle hub that corresponds to the detected traffic condition. The indication of the traffic condition may be received from a computing system (e.g., the hub computing system 450) of the autonomous vehicle hub. As described herein, the autonomous vehicle hub may include sensors such as proximity sensors, cameras, radar, or LiDAR, among others, which may be utilized to detect the presence of adverse traffic conditions (e.g., by executing artificial intelligence models). Although certain artificial intelligence models are described herein as being executed by autonomous vehicles, it should be understood that any artificial intelligence model, including artificial intelligence models that detect or predict current traffic conditions using perception data, may be executed by the computing system of the autonomous vehicle hub.

The traffic condition may include an indication that predetermined number (e.g., a total capacity of the autonomous vehicle hub) of autonomous vehicles are already present at the autonomous vehicle hub, and, therefore, the autonomous vehicle hub cannot accommodate any additional autonomous vehicles until some depart. The indication may include a type of traffic condition at the autonomous vehicle hub or road, which may include traffic congestion, traffic jams, accidents, or construction-related slow-downs, among others. The indication may indicate a detected cause of the traffic condition, for example, detected closed lanes (including identifiers of the lanes), detected construction work or construction-related slowdowns, a detected accident or collision, or a detected obstruction or obstacle on the road or shoulder, among others. The indication may include a location of the detected traffic condition. The remote server may utilize the indication of the traffic condition to generate control commands for autonomous vehicles to reduce current or potential congestion at autonomous vehicle hubs.

In some implementations, the remote server itself may detect a traffic condition for an autonomous vehicle hub based on the monitored locations and routes of multiple autonomous vehicles. For example, the remote server may receive location data, and route information, for each autonomous vehicle in communication with the remote server. The route information for a mission may include indications of an expected arrival time of the autonomous vehicles at different points on the route, which may include one or more autonomous vehicle hubs. The remote server may further receive information relating to the available capacity of one or more autonomous vehicle hubs. If the remote server determines that the projected arrival time of one or more autonomous vehicles at an autonomous vehicle hub would exceed the available capacity of the hub, the remote server can identify that the autonomous vehicle hub is projected to experience an adverse traffic condition and may generate control commands using the techniques described herein to address the projected traffic condition.

At step 520 of the method 500, the remote server can identify one or more autonomous vehicles traveling a route that includes the autonomous vehicle hub(s) corresponding to the indication of the adverse traffic condition. The autonomous vehicle hub may be identified, for example, by correlating the detected traffic condition with map data that includes locations of autonomous vehicle hubs. The remote server can identify autonomous vehicles that may be affected by the traffic condition when attempting to navigate to the affected autonomous vehicle hub. To do so, the remote server may access mission control data for each in-flight (e.g., currently operating and driving) autonomous vehicles. The mission control data may be maintained locally at the server or may be retrieved from the autonomous vehicle(s) via network communications (e.g., a request transmitted from the remote server).

When accessing the mission control data of the autonomous vehicle(s), the remote server can determine whether the route being traveled by the autonomous vehicle includes the autonomous vehicle hub corresponding to the detected traffic condition. If the route traveled by the autonomous vehicle includes the affected hub, the remote server can identify the autonomous vehicle as one that may be affected by the adverse traffic condition and may generate one or more control commands for the autonomous vehicle in further steps of the method 500. In some implementations, the remote server can determine that an autonomous vehicle would be affected by the traffic condition if the route indicates the autonomous vehicle will arrive at the autonomous vehicle hub within a predetermined amount of time from receiving the indication of the traffic condition.

For example, if the autonomous vehicle is expected to arrive at the autonomous vehicle hub a predetermined threshold amount of time (e.g., one hour, two hours, three hours, five hours, etc.) after the indication of the traffic condition has been received, the remote server can determine that the autonomous vehicle may not be affected by the detected traffic condition, because the traffic condition may be resolved once the autonomous vehicle arrives at the autonomous vehicle hub. Further, if the autonomous vehicle is expected to arrive at the autonomous vehicle hub at less than a predetermined threshold amount of time after the indication of the traffic condition has been received, remote server can determine that the autonomous vehicle will be affected by the traffic condition because it will arrive at the autonomous vehicle hub while the traffic condition is still present. The predetermined threshold time amount may be determined based on the type of traffic condition by, for example, referencing a lookup table with expected traffic condition types mapped to expected durations of the traffic condition. In one example, construction work may correspond to a longer duration, spanning days, while mild traffic congestion may correspond to durations spanning minutes.

At step 530 of the method 500, the remote server can generate one or more control commands for the identified autonomous vehicle(s) based on the route and the traffic conditions. The control commands may be utilized to reduce the congestion at, or proximate to, the autonomous vehicle hub caused by multiple autonomous vehicles arriving at or on the way to the autonomous vehicle hub at the same time. Because traffic conditions reduce the speed and throughput of autonomous vehicles, if unaddressed, traffic conditions may cause the autonomous vehicle hub to exceed its available capacity. To address these issues, the remote server can generate control commands for one or more of the autonomous vehicles identified in step 520 of the method 500. The control commands may be any type of command that changes the projected arrival time of the autonomous vehicle at the autonomous vehicle hub affected by a congestion condition.

In one example, the control command may include a command that causes the autonomous vehicle to slow down. The reduction in speed may be a predetermined amount, such as a one, two, or five mile-per-hour decrease in average speed. Although the reduction in speed may be slight, over long distances this reduction can cause the autonomous vehicle to arrive at the affected autonomous vehicle hub on its route significantly later than it otherwise would have, thereby reducing potential congestion at the autonomous vehicle hub. Although many autonomous vehicles may be identified in step 520 as candidates for the generation of control commands, in some implementations, the remote server may generate control commands for a subset of the identified autonomous vehicles. For example, the remote server may generate control commands to slow some of the autonomous vehicles such that a temporal distance between the arrival time of each autonomous vehicle at the autonomous vehicle hub is sufficient to reduce or eliminate the congestion or avoid potential congestion at the autonomous vehicle hub.

In some implementations, the control command may include a command to stop the autonomous vehicle. For example, in cases where slowing an autonomous vehicle is insufficient to reduce or eliminate the congestion or avoid potential congestion at the autonomous vehicle hub, the remote server may generate a command that causes the autonomous vehicle(s) to safely stop. Safely stopping the autonomous vehicle may include navigating to a shoulder (e.g., pulling over), a parking space, or other location to which the autonomous vehicle can navigate safely, and stopping the autonomous vehicle for a predetermined amount of time. The predetermined amount of time may be specified in the control command (e.g., selected such that a temporal distance between the arrival time of each autonomous vehicle at the autonomous vehicle hub satisfies a threshold value), or may be indefinite in duration (e.g., until a command to resume normal operation is provided to the autonomous vehicle).

In some implementations, the command to slow the autonomous vehicle may include a control command that causes the autonomous vehicle to navigate a predetermined distance from a second vehicle traveling towards the hub. For example, if the autonomous vehicle is traveling a route along a multi-lane roadway towards the autonomous vehicle hub, the command to slow the autonomous vehicle may include a command to navigate to a lane behind another vehicle traveling in the same direction as the autonomous vehicle. The other vehicle may be detected, and its speed and direction determined, based on perception data captured by the sensors of the autonomous vehicle. In one example, the autonomous vehicle may navigate to a slower-moving lane of a multi-lane roadway in response to the control command, such as the right-most lane of a multi-lane highway.

At step 540 of the method 500, the remote server can transmit the control command to the autonomous vehicle to mitigate the traffic condition at the autonomous vehicle hub. Once generated, the control command(s) may be communicated to the autonomous vehicle(s) via one or more networks (e.g., the network 430). The network may be a cellular network or another type of network. Once received, the components of the autonomous vehicle can parse and implement the control command by, for example, modifying the route traveled by the autonomous vehicle or changing the operating characteristics (e.g., reducing average speed, etc.) of the autonomous vehicle.

The remote server may continuously or periodically monitor the status of detected traffic condition at one or more autonomous hubs, and automatically generate and transmit additional control commands as needed. For example, the remote server may receive a second indication (e.g., from the hub computing system or from an autonomous vehicle located at or proximate to an autonomous vehicle hub) that a previously detected adverse traffic condition at the autonomous vehicle hub has been resolved. Upon detecting the change in traffic conditions, the remote server may generate further control command(s) for autonomous vehicle(s) previously identified (e.g., in step 520 of the method 500) as affected by the previously detected traffic condition. The further control commands may be commands that cause the autonomous vehicle(s) to resume traveling the route as normal (e.g., at normal speed, to resume traveling if stopped, etc.).

In some implementations, if the remote server receives an indication that a detected traffic condition is persisting beyond an expected time window (e.g., the predetermined duration for the traffic condition) or has worsened (e.g., changed from traffic congestion to a traffic jam), the autonomous vehicle may generate and transmit further control commands to adjust the operating parameters of the autonomous vehicle(s) identified in step 520. For example, the remote server may generate commands to further slow certain autonomous vehicle(s), or to cause some slowed autonomous vehicle(s) to stop completely for predetermined time periods or indefinitely (until a command to resume traveling as normal or at a slowed rate is received). The remote server may further identify additional autonomous vehicles that were not previously but may now be affected by any detected changes in traffic conditions of autonomous vehicle hub(s), and generate and transmit control commands to the autonomous vehicles to address potential congestion at the autonomous vehicle hub(s) using the techniques described in connection with steps 510-540.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and algorithm steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

monitoring, by one or more processors coupled to memory, a traffic condition at an autonomous vehicle hub;

determine a change in the traffic condition based on the monitoring;

upon determining that the traffic condition at the autonomous vehicle hub has changed, identifying, by the one or more processors, an autonomous vehicle traveling a route that includes the autonomous vehicle hub;

generating, by the one or more processors, a control command for the autonomous vehicle based on the route and a change in the traffic condition, wherein the control command causes the autonomous vehicle to correct the change in traffic condition; and transmitting, by the one or more processors, the control command to the autonomous vehicle to correct the traffic condition at the autonomous vehicle hub, wherein the autonomous vehicle is configured execute the control command.

2. The method of claim 1, wherein the traffic condition comprises a predetermined number of autonomous vehicles being located at the autonomous vehicle hub.

3. The method of claim 1, wherein the indication is received from a second autonomous vehicle at the autonomous vehicle hub.

4. The method of claim 1, wherein the indication is received from a computing system of the autonomous vehicle hub.

5. The method of claim 1, wherein identifying the autonomous vehicle comprises accessing, by the one or more processors, mission control data for a plurality of autonomous vehicles.

6. The method of claim 1, wherein the control command comprises a command that causes the autonomous vehicle to slow down.

7. The method of claim 1, wherein the control command comprises a command that causes the autonomous vehicle to navigate a predetermined distance from a second vehicle traveling towards the autonomous vehicle hub.

8. The method of claim 1, wherein the control command comprises a command to stop the autonomous vehicle.

9. The method of claim 1, further comprising:

receiving, by the one or more processors, a second indication that the traffic condition at the autonomous vehicle hub has been resolved; and generating, by the one or more processors, a second control command for the autonomous vehicle responsive to the second indication.

10. The method of claim 9, wherein the second control command comprises a command to resume traveling the route.

11. A system, comprising:

one or more processors coupled to non-transitory memory, the one or more processors configured to:

monitor an indication of a traffic condition at an autonomous vehicle hub;

determine a change in the traffic condition based on the monitoring;

upon determining that a traffic condition at the autonomous vehicle hub has changed, identify an autonomous vehicle traveling a route that includes the autonomous vehicle hub;

generate a control command for the autonomous vehicle based on the route and a change in the traffic condition, wherein the control command causes the autonomous vehicle to correct the change in traffic condition; and transmit the control command to the autonomous vehicle to correct the traffic condition at the autonomous vehicle hub, wherein the autonomous vehicle is configured execute the control command.

12. The system of claim 11, wherein the traffic condition comprises a predetermined number of autonomous vehicles being located at the autonomous vehicle hub.

13. The system of claim 11, wherein the indication is received from a second autonomous vehicle at the autonomous vehicle hub.

14. The system of claim 11, wherein the indication is received from a computing system of the autonomous vehicle hub.

15. The system of claim 11, wherein the one or more processors are further configured to identify the autonomous vehicle by performing operations comprising accessing mission control data for a plurality of autonomous vehicles.

16. The system of claim 11, wherein the control command comprises a command that causes the autonomous vehicle to slow down.

17. The system of claim 11, wherein the control command comprises a command that causes the autonomous vehicle to navigate a predetermined distance from a second vehicle traveling towards the autonomous vehicle hub.

18. The system of claim 11, wherein the control command comprises a command to stop the autonomous vehicle.

19. The system of claim 11, wherein the one or more processors are further configured to:

receive a second indication that the traffic condition at the autonomous vehicle hub has been resolved; and generate a second control command for the autonomous vehicle responsive to the second indication.

20. The system of claim 19, wherein the second control command comprises a command to resume traveling the route.

* * * * *